S. OAKMAN.
MOLDING GLASS.

No. 187,725. Patented Feb. 27, 1877.

WITNESSES.
Frank G. Parker
Nath. Evans

INVENTOR.
Samuel Oakman
per William Edson Att

2 Sheets—Sheet 2.

S. OAKMAN.
MOLDING GLASS.

No. 187,725. Patented Feb. 27, 1877.

WITNESSES
Frank G. Parker
Nath'l Evans

INVENTOR
Samuel Oakman
per William Edson Atty

UNITED STATES PATENT OFFICE.

SAMUEL OAKMAN, OF WINCHESTER, MASSACHUSETTS.

IMPROVEMENT IN MOLDING GLASS.

Specification forming part of Letters Patent No. 187,725, dated February 27, 1877; application filed February 6, 1877.

*To all whom it may concern:*

Be it known that I, SAMUEL OAKMAN, of Winchester, in the county of Middlesex and State of Massachusetts, have invented a new and useful Improvement in Molding Glass, of which the following is a specification:

My invention consists in a method of forming glass necks for bottles, pipes, &c. Said method consists in molding on the blown glass a re-enforcing ring, which forms a strong shoulder for supporting a gasket, or for giving additional strength to the neck or pipe.

My invention also consists in an improved mold for forming the re-enforcing shoulder on the glass.

Figure 1:
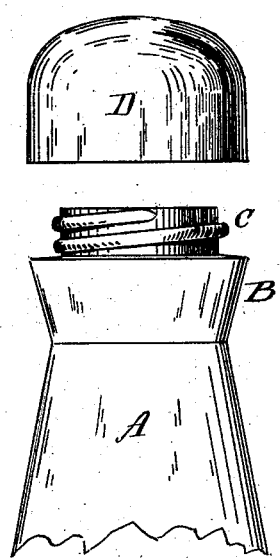
Figure 2:
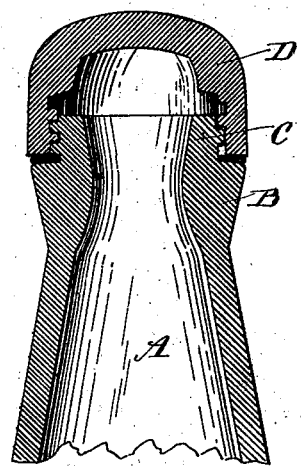
Figure 3:
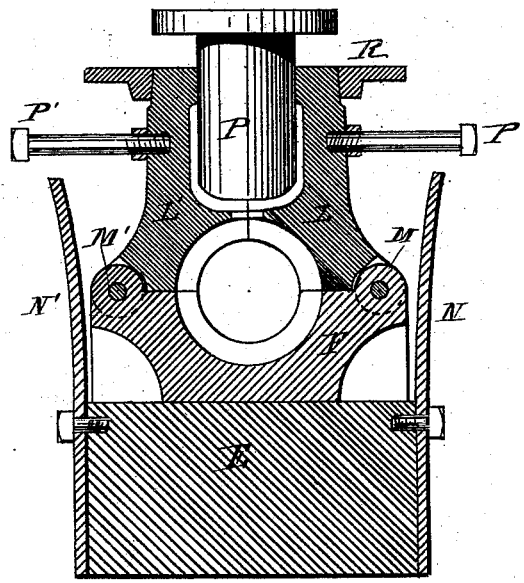
Figure 4:
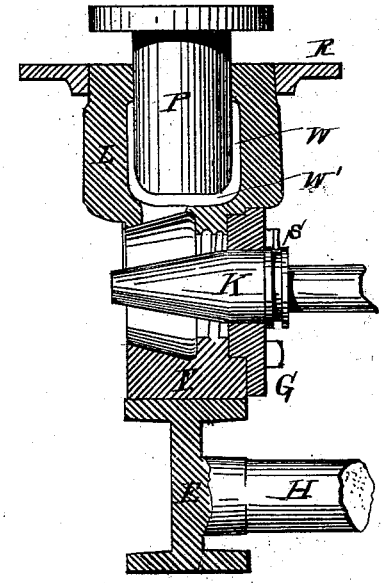
Figure 5:
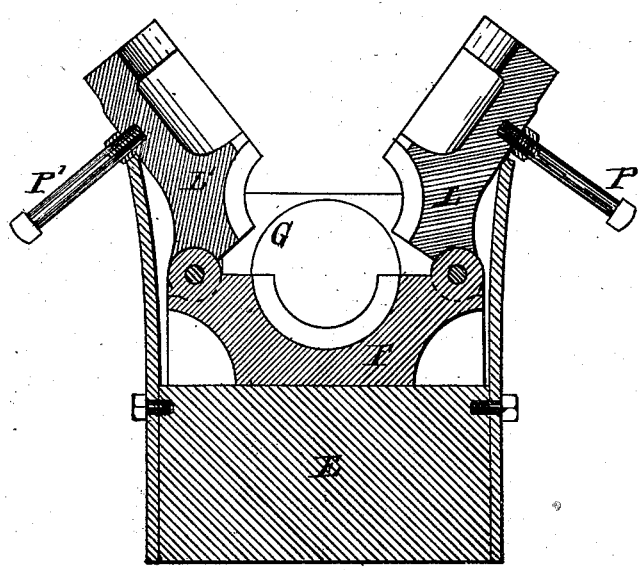

Figure 1 is an elevation, showing one of my improved glass necks. Fig. 2 is a section of the same. Fig. 3 is a vertical section of my mold. Fig. 4 is a vertical section of the same, taken at right angles to the section in Fig. 3. Fig. 5 is a vertical section on the plane of Fig. 3, with the mold open.

My invention is particularly designed for forming a strong screw-shoulder and neck on large glass bottles like "carboys," but is also adapted for forming shoulders on pipes.

I first form the neck of the bottle, in the usual manner, by blowing; then, while the glass is still hot, I insert the part upon which I wish to form the shoulder and screw-neck into a mold, formed substantially as shown in Figs. 3, 4, and 5; then, the mold being closed and some molten glass placed in the well W, Figs. 3 and 4, the plunger P being removed, the whole is placed under a press, and then molten glass is forced by the descending plunger P around the neck A, thus forming the shoulder B and screw C.

The full operation will be best understood from the following description of the mold and its use.

Let E H, Figs. 3, 4, and 5, represent a base and steadying-slide H, for connecting the mold with a press. F forms the lower part of the mold, and is so formed as to give the required shape to one side of the shoulder B and screw C, the other side being formed by the hinged parts L L', Figs. 3, 4, and 5. The upper parts L L' of the mold are made so as to be opened, as shown in Fig. 5, for the purpose of admitting the neck of the bottle A or a tube, if desirable. The part G, Figs. 4 and 5, forms the end of the neck of the bottle. K, Fig. 4, is a removable spindle, which forms the interior of the neck of the bottle, and is held in place by a latch, S, Fig. 5. R is a holding-ring, which is placed around the upper ends of the parts L L', and serves to bind them together while under the press. P and P serve as handles for opening and closing the mold. N N are side supporters, to keep the parts L L' from opening too far. W is a well-room, formed in the upper part of the mold, and serves to receive the molten glass from which the shoulder B is formed.

To use my device, I proceed as follows: The upper parts L L' are closed, and the pin K in place, as shown in Fig. 4. The neck of the bottle, still hot, is inserted; then the molten glass is placed in the well W, and the whole put under the press, the operation of which is to force down the plunger P, and drive the glass from the well onto and around the neck of the bottle, thus forming the shoulder B and screw C. When this operation is complete, the pin K is removed, and the mold opened, and the article taken out.

Having now described the construction and operation of my invention, what I claim, and desire to secure by Letters Patent, is as follows:

1. As an improvement in the art of manufacturing glassware, first forming the neck A, in the usual manner, and then placing it in the mold, and forming the shoulder B and screw C, as described, and for the purpose set forth.

2. The combination of the parts F with the opening parts L L', back piece G, and spindle K, all operating together substantially as described, and for the purpose set forth.

3. As a new article of manufacture, a glass bottle having a re-enforced shoulder and screw-neck, substantially as described, and for the purpose set forth.

SAMUEL OAKMAN.

Witnesses:
NATHL. EVANS,
WILLIAM EDSON.